(12) United States Patent
Wang et al.

(10) Patent No.: US 9,204,662 B2
(45) Date of Patent: Dec. 8, 2015

(54) METHOD FOR PRODUCING CLEAR, CONCENTRATED SWEET POTATO JUICE

(75) Inventors: Sixin Wang, Tianjin (CN); Chuanzhu Leng, Tianjin (CN); Xihong Li, Tianjin (CN); Haitao Ye, Tianjin (CN); Yajun Sun, Tianjin (CN); Yage Xing, Tianjin (CN); Weili Li, Tianjin (CN); Ting Xue, Tianjin (CN); Haidong Liu, Tianjin (CN); Chongxiao Shao, Tianjin (CN); Weiqi Yang, Tianjin (CN); Jing Jin, Tianjin (CN)

(73) Assignees: SDIC ZHONGLU FRUIT JUICE CO., LTD., Beijing (CN); Xihong Li, Tianjin (CN)

( * ) Notice: Subject to any disclaimer, the term of this patent is extended or adjusted under 35 U.S.C. 154(b) by 499 days.

(21) Appl. No.: 13/494,972

(22) Filed: Jun. 12, 2012

(65) Prior Publication Data
US 2012/0258200 A1 Oct. 11, 2012

Related U.S. Application Data

(63) Continuation-in-part of application No. PCT/CN2010/077977, filed on Oct. 22, 2010.

(51) Int. Cl.
A23L 2/02 (2006.01)
A23L 2/72 (2006.01)
A23L 1/214 (2006.01)
A23L 1/308 (2006.01)
A23L 2/04 (2006.01)

(52) U.S. Cl.
CPC .............. *A23L 1/2142* (2013.01); *A23L 1/3081* (2013.01); *A23L 2/04* (2013.01); *A23L 2/72* (2013.01)

(58) Field of Classification Search
CPC .......... A23L 1/034; A23L 1/2142; A23L 2/84
See application file for complete search history.

(56) References Cited

U.S. PATENT DOCUMENTS

| 4,156,026 | A  | * | 5/1979 | Gogel | ........................... | 426/271 |
| 4,695,472 | A  | * | 9/1987 | Dunn et al. | ................... | 426/237 |
| 2005/0100635 | A1 | * | 5/2005 | Firary et al. | .................... | 426/53 |

OTHER PUBLICATIONS

Meyer, et al., Enzymatic solubilization of a pectinaceous dietary fiber fraction from potato pulp: Optimization of the fiber extraction process, vol. 43, Issue 1, Jan. 15, 2009, pp. 106-112.*

* cited by examiner

*Primary Examiner* — D. Lawrence Tarazano
*Assistant Examiner* — Philip Dubois
(74) *Attorney, Agent, or Firm* — Matthias Scholl P.C.; Matthias Scholl

(57) ABSTRACT

A method for producing clear, concentrated sweet potato juice, including: a) cleaning, peeling, crushing, and gelatinizing a raw material of sweet potatoes to yield a sweet potato paste, and squeezing the sweet potato paste to obtain skin dregs and a squeezed clear juice; b) performing enzymolysis to part of the skin dregs and adding the hydrolyzed skin dregs to the sweet potato paste for squeezing; c) performing enzymolysis and filtering to the squeezed clear juice to obtain a sweet potato clear juice; d) combining the rest part of the skin dregs and sweet potato skins generated during the peeling process to obtain a sweet potato residue; e) extracting dietary fiber from the sweet potato residue; and f) adding the dietary fiber to the sweet potato clear juice and post-treating the sweet potato clear juice.

11 Claims, 1 Drawing Sheet

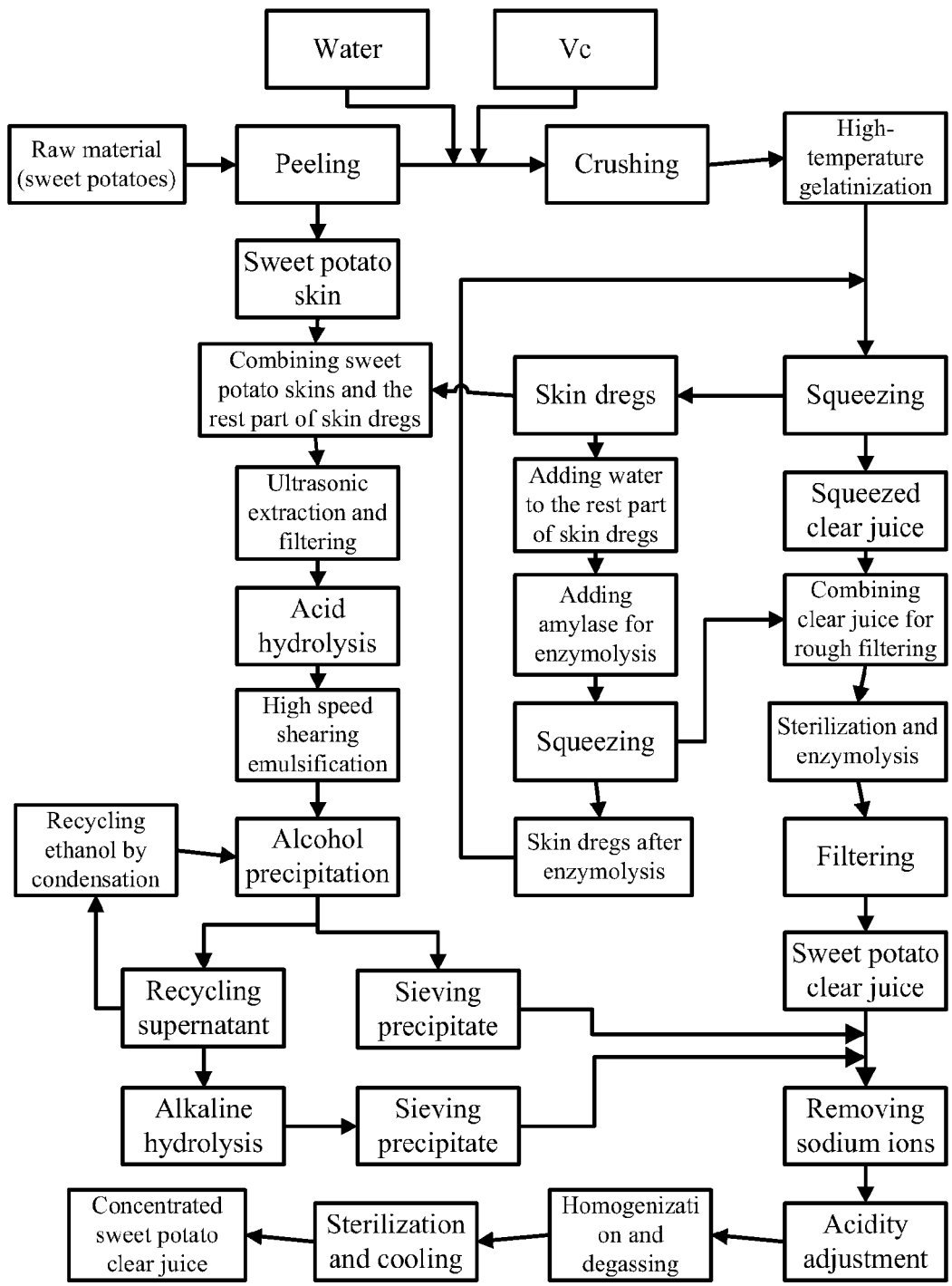

METHOD FOR PRODUCING CLEAR, CONCENTRATED SWEET POTATO JUICE

CROSS-REFERENCE TO RELATED APPLICATIONS

This application is a continuation-in-part of International Patent Application No. PCT/CN2010/077977 with an international filing date of Oct. 22, 2010, designating the United States, now pending, and further claims priority benefits to Chinese Patent Application No. 201010511797.3 filed Oct. 19, 2010. The contents of all of the aforementioned applications, including any intervening amendments thereto, are incorporated herein by reference.

BACKGROUND OF THE INVENTION

1. Field of the Invention

The invention relates to the technical field of food processing, and more particularly to a production method of a clear, concentrated sweet potato juice.

2. Description of the Related Art

At present, the sweet potato juice is mostly extracted by hot squeezing. The conventional hot squeezing type production process of a sweet potato juice is as follows: taking fresh sweet potatoes as the raw material; preparing a paste by peeling, crushing, and high-temperature gelatinization; squeezing and saccharifying to obtain a sweet potato paste; and filtering the sweet potato paste to obtain the sweet potato juice.

However, after the crushed sweet potatoes are gelatinized at high temperature, the celluloses of the paste are destroyed. A lot of pulp overflows during the squeezing process and is attached onto the press belt. Thus, the juice yield is reduced; the squeezed juice contains a lot of pulp, which increases cost and difficulty for the subsequent filtering and clarification.

Moreover, the overflow of the sweet potato paste will become more serious along with the rise of temperature and the extension of acting time of the sweet potato paste, thus the catalytic temperature and time of thermostable a-amylase during the decomposition of starch in the sweet potato paste are affected, which is unfavorable to the full conversion of starch in the paste.

The sweet potato skin and skin dregs (generally called sweet potato residue) are separated during the peeling and squeezing process of sweet potato in the prior art. The content of sweet potato residue is generally up to 40-55 wt. % in the prior art. The sweet potato residue contains a large number of dietary fibers which have important physiological function to human body.

The dietary fiber includes two basic types when it is dissolved in water: water soluble fiber and water insoluble fiber. The water soluble fiber can slow down the digestion rate and excrete cholesterol rapidly, so that the blood glucose and cholesterol can be controlled at an optimal level. The water insoluble fiber can reduce the risk of bowel cancer, prevent constipation and diverticulitis by absorbing the toxic substances in food, and reduce the toxins from bacteria in the digestive tract.

However, the sweet potato skin and sweet potato residue are usually used as fertilizer in the prior art, some are used as feed after treatment, and the active ingredients are not fully utilized.

SUMMARY OF THE INVENTION

The invention provides a production method of a clear, concentrated sweet potato juice. The enzymolysis treatment is performed to part of skin dregs generated during the squeezing process to improve the sweet potato juice squeezing technology, thus not only the production efficiency and the juice yield of sweet potato juice are improved, but also a certain amount of sweet potato juice after skin dregs treatment can be obtained, and the production of sweet potato juice is increased. The extra sweet potato residue is also fully utilized for extracting dietary fiber, thus the waste treatment cost is reduced, and meanwhile, the nutritive value of the clear, concentrated sweet potato juice is improved.

A production method of a clear, concentrated sweet potato juice, comprising the following steps:

cleaning, peeling, crushing, and gelatinizing a raw material of sweet potatoes to yield a sweet potato paste, and squeezing the sweet potato paste to obtain skin dregs and a squeezed clear juice;

performing enzymolysis to part of the skin dregs and adding the hydrolyzed skin dregs to the sweet potato paste for squeezing;

performing enzymolysis and filtering to the squeezed clear juice to obtain a sweet potato clear juice;

combining the rest part of the skin dregs and sweet potato skins generated during the peeling process to obtain a sweet potato residue;

extracting dietary fiber from the sweet potato residue; and adding the dietary fiber to the sweet potato clear juice and post-treating the sweet potato clear juice to obtain a clear, concentrated sweet potato juice.

The skin dregs and the squeezed clear juice are obtained after squeezing. The enzymolysis treatment is performed to part of skin dregs to utilize the active ingredients in the skin dregs, and the hydrolyzed skin dregs can be re-added to the sweet potato paste before squeezing for recycling.

The proportion of the skin dregs for enzymolysis treatment is not strictly limited in the total amount of the skin dregs. Generally, the weight ratio between the hydrolyzed skin dregs and the sweet potato paste is 5-10:100 during the process of adding the hydrolyzed skin dregs into the sweet potato paste before squeezing. Based on the weight change of the skin dregs before and after enzymolysis treatment, in general, the weight of the skin dregs for enzymolysis treatment accounts for 15-30% of the total weight of the skin dregs.

The enzymolysis treatment of skin dregs: water is added to the skin dregs, the weight of water accounts for 5-10% of that of the skin dregs (for enzymolysis treatment), amylase is added for enzymolysis after the addition of water, the weight of the amylase accounts for 0.1-0.3% of that of the skin dregs (for enzymolysis treatment), the enzymolysis temperature is 85-95° C., the enzymolysis time is 1-2 hours. The squeezing is carried out again after the enzymolysis to obtain hydrolyzed skin dregs and a squeezed sweet potato juice. The squeezed sweet potato juice is combined with the squeezed clear juice to obtain the sweet potato clear juice after enzymolysis and filtering.

The hydrolyzed skin dregs are added to the sweet potato paste for squeezing. If there are extra skin dregs, they can be applied to other production lines of sweet potato clear juice for improving the squeezing technology thereof.

It should be noted that when there is no foreign hydrolyzed skin dregs, no skin dregs are added during the first squeezing. The hydrolyzed skin dregs can be obtained after the first squeezing, and then the hydrolyzed skin dregs is added during the subsequent squeezing process and can be recycled.

The enzymolysis treatment is performed to part of the skin dregs, and the rest part is combined with the sweet potato skin generated during the peeling process to obtain the sweet potato residue. Extracting the dietary fiber from the sweet potato residue comprises the following steps:

(1) Adding warm water A to the sweet potato residue, and performing ultrasonic extraction in an ultrasonic extractor;

The ultrasonic extraction conditions are as follows: ultrasonic power: 400-1,200 W, temperature: 30-60° C., and time: 30-40 min. The temperature of warm water A is 45-60° C., preferably, 50° C., and the weight of warm water A is 3-5 times that of the sweet potato residue.

The sweet potato residue can be added with water for cleaning and filtered as required, and then added with the warm water A.

(2) Adding warm water B to a system obtained after the completion of the ultrasonic extraction, adjusting the pH of the system to 1.5-2 with a citric acid aqueous solution with a mass percentage concentration of 10%, and performing hydrolysis for 80-150 min at a temperature of 30-80° C. (stirring at a uniform speed during the hydrolysis) to obtain a hydrolyzed sweet potato residue liquid;

The weight of the warm water B is 10-20 times that of the sweet potato residue in the step (1), and the temperature of the warm water B is 45-60° C., and, 50° C.

Both the warm water A and the warm water B are warm water, only the time of adding is different, and such a statement is just easy to distinguish.

The hydrolysis temperature is preferably 60-80° C., the hydrolysis time is preferably 120-150 min, and appropriately extending the hydrolysis time and increasing the hydrolysis temperature are more favorable for reducing the upper limit of fiber length during the next shearing emulsification and more conducive to the human body to absorb.

(3) performing shearing emulsification to the sweet potato residue liquid for 30-60 min using a high-shear mixing emulsification machine, so as to obtain a sheared and emulsified sweet potato residue liquid, the fiber length in the sheared and emulsified sweet potato residue liquid being 0.1-6 microns;

(4) adding absolute ethyl alcohol to the sheared and emulsified sweet potato residue liquid for alcohol precipitation for 30-60 min to obtain a supernatant and a precipitate, the weight of the absolute ethyl alcohol being 8-13% of that of the sheared and emulsified sweet potato residue liquid, preferably, 10%, heating the supernatant to obtain recycled ethanol and a residual liquid, and treating the recycled ethanol for recycling; and (5) sieving the precipitate obtained in step (4) using a 80-100 mesh sieve to obtain water soluble fibers such as pectin and glucan (those getting through the screen mesh), i.e., dietary fiber A; adding food grade sodium bicarbonate to the residual liquid obtained in the step (4), adjusting the pH to 10-12, performing alkaline hydrolysis for 60-90 min at normal temperature to obtain an alkaline hydrolysis liquid, centrifuging the alkaline hydrolysis liquid at 8,000-12,000 rpm, collecting precipitates (cellulose, hemicellulose, lignin, and resistant starch) and sieving with a 80-100 mesh sieve to obtain water insoluble fibers (those getting through a screen mesh), i.e., dietary fiber B.

The dietary fiber A and the dietary fiber B are combined to obtain the dietary fiber, and then the dietary fiber is added to the sweet potato clear juice for post-treatment.

During the process of peeling, crushing, and gelatinizing the raw material of sweet potatoes, enzymolysis and filtering of the squeezed clear juice as well as the post-treatment of the sweet potato clear juice can adopt conventional methods.

For example, the peeled and crushed raw material of sweet potatoes is heated to 85-95° C. and the temperature is maintained for 0.5-2 hours for the completion of gelatinization.

According to the conditions, water can be appropriately added to avoid the sweet potato paste to be too dry and thick during the crushing process of the sweet potatoes. The amount of the added water is not strictly limited. In general, the weight ratio between water and the sweet potatoes is 0.5-1.5:1, and 40-60° C. demineralized water is preferably used during the water adding process.

The crushed sweet potato is easily oxidized and browns, which affects the color of products. Preferably, Vc is added before the crushing of the raw material of sweet potatoes for color protection. The weight of the added Vc is 0.075-0.1% of that of the raw material of sweet potatoes. If water is added to the sweet potato before crushing, the weight of the sweet potatoes before crushing also includes the weight of the added water.

The squeezed clear juice is generally sterilized before enzymolysis, for example, the squeezed clear juice is heated to 95° C. above (95-120° C.), holds for 30 s and then is cooled to 40° C. below. The pH is adjusted to 4-6 with a citric acid, and then enzymes are added for enzymolysis. Saccharifying enzyme, pectinase, and protease can be added to the squeezed clear juice for enzymolysis. The enzymolysis can be carried out at room temperature. The squeezed clear juice can be properly heated to 40° C. for enhancing the enzyme activity, and the enzymolysis time is 3-4 hours;

The weight ratio between the squeezed clear juice required for enzymolysis and enzyme is 1:0.001-0.002. The enzyme described herein is the sum of weight of saccharifying enzyme, pectinase, and protease. The appropriate relationship among the dosage of the saccharifying enzyme, pectinase, and protease is selected according to the characteristics of sweet potatoes, so that the nutrients in the sweet potatoes can be fully utilized and converted. The obtained high-glycoprotein clear, concentrated sweet potato juice is better in taste and color. Preferably, the weight ratio among the saccharifying enzyme, pectinase, and protease is 2:2:1.

During the post-treatment of the sweet potato clear juice, the cation exchange resin is utilized for removing the sodium ions contained in the sweet potato clear juice, and then a sweet potato clear juice rich in sweet potato dietary fiber is obtained after acidity adjustment, blending, homogenization, degassing, high-temperature instantaneous sterilization, cooling, and filling. The citric acid is usually adopted during the acidity adjustment to adjust the pH to 3-4. The high-temperature instantaneous sterilization generally can be carried out at 105-120° C. for 15-25 s.

Advantages of the invention are summarized below. The hydrolyzed skin dregs are added during the squeezing process of the sweet potato paste, so as to prevent the sweet potato paste from overflowing. The pulp in the juice is reduced, thus the raw juice is clearer. In addition, the hydrolyzed skin dregs can be recycled, so that the juice yield is improved by 15-30% compared with conventional methods, and the juice yield can be up to 116-151%. Furthermore, the dietary fibers (water-soluble dietary fiber and water-insoluble dietary fiber) contained in the sweet potato skin and skin dregs are separated out to the utmost extent and added to the sweet potato clear juice, thus a clear, concentrated sweet potato juice drink with high dietary fiber is finally obtained. The content of dietary fiber of the product is up to 95%, so that the product is conducive to the human body to absorb. The processing not only fully utilizes the wastes, reduces the waste treatment cost, and meanwhile, increases the nutritive value of the product.

BRIEF DESCRIPTION OF THE DRAWINGS

The invention is described hereinbelow with reference to accompanying drawings, in which the sole FIGURE is a flow diagram of a production method of a clear, concentrated sweet potato juice.

DETAILED DESCRIPTION OF THE EMBODIMENTS

Example 1

As shown in FIG. 1, 55 kg of raw material sweet potatoes are mechanically peeled to obtain 50 kg of peeled sweet potatoes and 5 kg of sweet potato skin. 50 kg of water and 0.1 kg of Vc are added to the peeled sweet potatoes, and then the peeled sweet potatoes are crushed and heated to 95° C., and gelatinized for 0.5 hour, so as to obtain 100 kg of a sweet potato paste.

The sweet potato paste is squeezed to obtain 60 kg of skin dregs and 40 kg of a squeezed clear juice.

15 kg of the skin dregs are taken for enzymolysis treatment, and the rest 45 kg of the skin dregs are used for extracting dietary fiber.

During the enzymolysis treatment, 1.5 kg of water is added to 15 kg of the skin dregs, and then 0.015 kg of amylase is added for enzymolysis for 2 hours at the temperature of 90° C. The squeezing is carried out again after the completion of enzymolysis to obtain 10 kg of hydrolyzed skin dregs and 6 kg of a squeezed sweet potato juice. The 6 kg of squeezed sweet potato juice and the 40 kg of the squeezed clear juice are combined to obtain 46 kg of squeezed clear juice.

The rough filtering and enzymolysis (0.02 kg of saccharifying enzyme, 0.02 kg of pectinase, and 0.01 kg of protease are added, and the enzymolysis is carried out for 2 hours at the temperature of 40° C.) are performed to the 46 kg of squeezed clear juice in sequence, and then 45.5 kg of a sweet potato clear juice is obtained after filtering.

At the same time, the 5 kg of sweet potato skin and the 45 kg of skin dregs used for extracting dietary fiber are combined to obtain 50 kg of a sweet potato residue. 200 kg of warm water with temperature of 50° C. is added to the sweet potato residue. The ultrasonic extraction is carried out in an ultrasonic extractor, the ultrasonic power is 1,200 W, the temperature is 60° C., and the time is 40 min.

500 kg of warm water with temperature of 50° C. is added after the completion of ultrasonic extraction, the pH is adjusted to 2 with a citric acid aqueous solution with a mass percentage concentration of 10%, and a hydrolyzed sweet potato residue liquid is obtained after hydrolysis for 120 min at 60° C.

The shearing emulsification is performed to the hydrolyzed sweet potato residue liquid for 30 min through a high-shear mixing emulsification machine, so as to obtain a sheared and emulsified sweet potato residue liquid, and the fiber length in the sheared and emulsified sweet potato residue liquid is 0.1-6 microns.

75 kg of absolute ethyl alcohol is added to the sheared and emulsified sweet potato residue liquid for alcohol precipitation for 40 min to obtain a supernatant and a precipitate. The supernatant is heated to obtain a recycled ethanol and a residual liquid, and the precipitate is sieved with a 100 mesh sieve to obtain pectin, glucan and other water soluble fibers (3.5 kg in total); the recycled ethanol is further treated to obtain absolute ethyl alcohol, and the absolute ethyl alcohol can be repeatedly used.

The residual liquid adopts food grade sodium bicarbonate to adjust the pH to 10. The alkaline hydrolysis is carried out for 60 min at normal temperature to obtain an alkaline hydrolysis liquid. The alkaline hydrolysis liquid is centrifuged at 8,000 rpm, and then the precipitates (cellulose, hemicellulose, lignin and resistant starch) are collected and sieved with a 100 mesh sieve to obtain water insoluble fiber (11 kg in total).

3.5 kg of the water soluble fiber and 11 kg of the water insoluble fiber are added to 45.5 kg of the sweet potato clear juice to obtain 60 kg of sweet potato clear juice containing dietary fiber. The sodium ions in the sweet potato clear juice containing dietary fiber are removed with a cation exchange resin, the pH is adjusted to 4 with a citric acid, and then a clear, concentrated sweet potato juice with high dietary fiber is obtained after blending, homogenization, degassing, high-temperature instantaneous sterilization (120° C., holds for 15 s), cooling, and filling.

Juice yield: (60−1.5)/(100−50)=117%.

Notes: the juice yield is equal to (the clear, concentrated sweet potato juice containing dietary fiber−the water added during the enzymolysis of skin dregs)/(sweet potato paste−the water added during the crushing process of sweet potato) *100%.

The above-mentioned description is the first juicing process.

In the second juicing process, first, 55 kg of raw material sweet potatoes are mechanically peeled to obtain 50 kg of peeled sweet potatoes and 5 kg of sweet potato skin. 50 kg of water and 0.1 kg of Vc are added to the peeled sweet potatoes, and then the peeled sweet potatoes are crushed and heated to 95° C. and gelatinized after holding for 0.5 hour, so as to obtain 100 kg of a sweet potato paste.

10 kg of hydrolyzed skin dregs obtained in the first juicing process is added to the sweet potato paste, and then the sweet potato paste is squeezed to obtain 50 kg of skin dregs of second squeezing and 60 kg of clear juice of second squeezing.

15 kg of the skin dregs of second squeezing is taken for enzymolysis treatment, and the rest 35 kg of the skin dregs of second squeezing is used for extracting dietary fiber.

During the enzymolysis treatment, 1.5 kg of water is added to the 15 kg of skin dregs, then 0.015 kg of amylase is added, the enzymolysis is carried out for 2 hours at the temperature of 90° C., the squeezing is carried out again after the completion of enzymolysis to obtain 10 kg of hydrolyzed skin dregs (can be used indiscriminately for times in the subsequent squeezing process) and 5.5 kg of squeezed sweet potato juice, and the 5.5 kg of squeezed sweet potato juice and the aforesaid 60 kg of clear juice of second squeezing are combined to obtain 65.5 kg of squeezed clear juice.

The rough filtering and enzymolysis (The 0.04 kg of saccharifying enzyme, 0.04 kg of pectinase and 0.02 kg of protease are added, and the enzymolysis is carried out for 2 hours at the temperature of 40° C.) are performed to the 65.5 kg of squeezed clear juice in sequence, and then 65.5 kg of sweet potato clear juice is obtained after filtering.

At the same time, the 5 kg of sweet potato skin obtained during the second juicing process and the 35 kg of skin dregs obtained during the second juicing process and used for extracting dietary fiber are combined to obtain 40 kg of sweet potato residue. 160 kg of warm water with temperature of 50° C. is added to the sweet potato residue. The ultrasonic extraction is carried out in an ultrasonic extractor, the ultrasonic power is 1,200 W, the temperature is 60° C., and the time is 40 min.

400 kg of warm water with temperature of 50° C. is added after the completion of ultrasonic extraction, the pH is adjusted to 2 with a citric acid aqueous solution with a mass percentage concentration of 10%, and the hydrolyzed sweet potato residue liquid is obtained after hydrolysis for 120 min at the temperature of 60° C.

The shearing emulsification is performed to the hydrolyzed sweet potato residue liquid for 30 min through a high-shear mixing emulsification machine, so as to obtain the sheared and emulsified sweet potato residue liquid, and the fiber length in the sheared and emulsified sweet potato residue liquid is 0.1-6 microns.

60 kg of absolute ethyl alcohol is added to the sheared and emulsified sweet potato residue liquid, the alcohol precipitation is carried out for 40 min to obtain a supernatant and a precipitate, wherein the supernatant is heated to obtain recycled ethanol and residual liquid, and the precipitate is sieved with a 100 mesh sieve to obtain pectin, glucan and other water soluble fibers (2.8 kg in total); the recycled ethanol is further treated to obtain absolute ethyl alcohol, and the absolute ethyl alcohol can be repeatedly used.

The residual liquid adopts food grade sodium bicarbonate, the pH is adjusted to 10, the alkaline hydrolysis is carried out for 60 min at normal temperature to obtain an alkaline hydrolysis liquid. The alkaline hydrolysis liquid is centrifuged at 8,000 rpm, and then the precipitates (cellulose, hemicellulose, lignin and resistant starch) are collected and sieved with a 100 mesh sieve to obtain water insoluble fiber (8.8 kg in total).

The 2.8 kg of water soluble fiber and the 8.7 kg of water insoluble fiber are added to the 65.5 kg of sweet potato clear juice obtained in the second juicing process to obtain 76.5 kg of sweet potato clear juice containing dietary fiber, the sodium ions in the sweet potato clear juice containing dietary fiber are removed with a cation exchange resin, the pH is adjusted to 4 with a citric acid, and then a clear, concentrated sweet potato juice with high dietary fiber is obtained after blending, homogenization, degassing, high-temperature instantaneous sterilization (120° C., holds for 15 s), cooling, and filling.

Juice yield: (76.5−1.5)/(100−50)=150%.

It can be seen that the hydrolyzed skin dregs obtained in the first juicing process is added before squeezing to prevent the sweet potato paste from overflowing during the squeezing process, so that the pulp in the juice is reduced, and the juice yield is improved.

Example 2

As shown in FIG. 1, 55 kg of raw material sweet potatoes are mechanically peeled to obtain 50 kg of peeled sweet potatoes and 5 kg of sweet potato skin. 50 kg of water and 0.08 kg of Vc are added to the peeled sweet potatoes, and then the peeled sweet potatoes are crushed and heated to 90° C., and gelatinized after holding for 1 hour, so as to obtain 100 kg of a sweet potato paste.

The sweet potato paste is squeezed to obtain 50 kg of skin dregs and 50 kg of squeezed clear juice. The 10 kg of skin dregs are taken for enzymolysis treatment, and the rest 40 kg of skin dregs are used for extracting dietary fiber.

During the enzymolysis treatment, 0.5 kg of water is added to the 10 kg of skin dregs, then 0.02 kg of amylase is added for enzymolysis for 1 hours at the temperature of 85° C., the squeezing is carried out again after the completion of enzymolysis to obtain 6 kg of hydrolyzed skin dregs and 4.5 kg of squeezed sweet potato juice, and the 4.5 kg of squeezed sweet potato juice and the 50 kg of squeezed clear juice are combined to obtain 54.5 kg of squeezed clear juice.

The rough filtering and enzymolysis (The 0.03 kg of saccharifying enzyme, 0.03 kg of pectinase and 0.02 kg of protease are added, and the enzymolysis is carried out for 3 hours at the temperature of 37° C.) are performed to the 46 kg of squeezed clear juice in sequence, and then 54.5 kg of sweet potato clear juice is obtained after filtering.

At the same time, the 5 kg of sweet potato skin and the 40 kg of skin dregs used for extracting dietary fiber are combined to obtain 45 kg of sweet potato residue, 200 kg of warm water with temperature of 50° C. is added to the sweet potato residue, the ultrasonic extraction is carried out in an ultrasonic extractor, the ultrasonic power is 1,200 W, the temperature is 50° C., and the time is 30 min.

600 kg of warm water with temperature of 50° C. is added after the completion of ultrasonic extraction, the pH is adjusted to 2 with a citric acid aqueous solution with mass percentage concentration of 10%, and the hydrolyzed sweet potato residue liquid is obtained after hydrolysis for 90 min at the temperature of 40° C.

The shearing emulsification is performed to the hydrolyzed sweet potato residue liquid for 40 min through a high-shear mixing emulsification machine, so as to obtain the sheared and emulsified sweet potato residue liquid, and the fiber length in the sheared and emulsified sweet potato residue liquid is 0.1-5 microns.

85 kg of absolute ethyl alcohol is added to the sheared and emulsified sweet potato residue liquid, the alcohol precipitation is carried out for 60 min to obtain supernatant and precipitate, wherein the supernatant is heated to obtain recycled ethanol and residual liquid, and the precipitate is sieved with a 100 mesh sieve to obtain pectin, glucan and other water soluble fibers (3 kg in total); the recycled ethanol is further treated to obtain absolute ethyl alcohol, and the absolute ethyl alcohol can be repeatedly used.

The residual liquid adopts food grade sodium bicarbonate, the pH is adjusted to 10, the alkaline hydrolysis is carried out for 90 min at normal temperature to obtain alkaline hydrolysis liquid. The alkaline hydrolysis liquid is centrifuged at 8,000 rpm, and then the precipitates (cellulose, hemicellulose, lignin and resistant starch) are collected and sieved with a 100 mesh sieve to obtain water insoluble fiber (9.6 kg in total).

The 3 kg of water soluble fiber and the 9.6 kg of water insoluble fiber are added to the 54.4 kg of sweet potato clear juice to obtain 67 kg of sweet potato clear juice containing dietary fiber, the sodium ions in the sweet potato clear juice containing dietary fiber are removed with a cation exchange resin, the pH is adjusted to 4 with a citric acid, and then a clear, concentrated sweet potato juice with high dietary fiber is obtained after blending, homogenization, degassing, high-temperature instantaneous sterilization (120° C., holds for 15 s), cooling, and filling.

Juice yield: (67−0.5)/(100−50)=133%.

The above-mentioned description is the first juicing process.

In the second juicing process, firstly, the 55 kg of raw material sweet potatoes are mechanically peeled to obtain 50 kg of peeled sweet potatoes and 5 kg of sweet potato skin, 50 kg of water and 0.1 kg of Vc are added to the peeled sweet potatoes, and then the peeled sweet potatoes are crushed and heated to 95° C. and gelatinized after holding for 0.5 hour, so as to obtain 100 kg of sweet potato paste.

The 6 kg of hydrolyzed skin dregs obtained in the first juicing process is added to the sweet potato paste, and then the sweet potato paste is squeezed to obtain 48 kg of skin dregs of second squeezing and 58 kg of clear juice of second squeezing.

The 14.4 kg of skin dregs of second squeezing is taken for enzymolysis treatment, and the rest 33.6 kg of skin dregs of second squeezing is used for extracting dietary fiber.

During the enzymolysis treatment, 1 kg of water is added to the 14.4 kg of skin dregs, then 0.02 kg of amylase is added to, the enzymolysis is carried out for 2 hours at the temperature of 90° C., the squeezing is carried out again after the completion of enzymolysis to obtain 9 kg of hydrolyzed skin dregs (can be used indiscriminately for times in the subsequent squeezing process) and 5.5 kg of squeezed sweet potato juice, and the 6.4 kg of squeezed sweet potato juice and the aforesaid 58 kg of clear juice of second squeezing are combined to obtain 64.4 kg of squeezed clear juice.

The rough filtering and enzymolysis (The 0.04 kg of saccharifying enzyme, 0.04 kg of pectinase and 0.02 kg of protease are added, and the enzymolysis is carried out for 4 hours at the temperature of 40° C.) are performed to the 64.4 kg of squeezed clear juice in sequence, and then 64.2 kg of sweet potato clear juice is obtained after filtering.

At the same time, the 5 kg of sweet potato skin obtained during the second juicing process and the 33.6 kg of skin dregs obtained during the second juicing process and used for extracting dietary fiber are combined to obtain 38.6 kg of sweet potato residue, 150 kg of warm water with temperature of 50° C. is added to the sweet potato residue, the ultrasonic extraction is carried out in an ultrasonic extractor, the ultrasonic power is 1,200 W, the temperature is 40° C., and the time is 40 min.

400 kg of warm water with temperature of 50° C. is added after the completion of ultrasonic extraction, the pH is adjusted to 2 with a citric acid aqueous solution with mass percentage concentration of 10%, and the hydrolyzed sweet potato residue liquid is obtained after hydrolysis for 80 min at the temperature of 60° C.

The shearing emulsification is performed to the hydrolyzed sweet potato residue liquid for 40 min through a high-shear mixing emulsification machine, so as to obtain the sheared and emulsified sweet potato residue liquid, and the fiber length in the sheared and emulsified sweet potato residue liquid is 0.3-4 microns.

60 kg of absolute ethyl alcohol is added to the sheared and emulsified sweet potato residue liquid, the alcohol precipitation is carried out for 40 min to obtain supernatant and precipitate, wherein the supernatant is heated to obtain recycled ethanol and residual liquid, and the precipitate is sieved with a 100 mesh sieve to obtain pectin, glucan and other water soluble fibers (2.7 kg in total); the recycled ethanol is further treated to obtain absolute ethyl alcohol, and the absolute ethyl alcohol can be repeatedly used.

The residual liquid adopts food grade sodium bicarbonate, the pH is adjusted to 10, the alkaline hydrolysis is carried out for 60 min at normal temperature to obtain an alkaline hydrolysis liquid, the alkaline hydrolysis liquid is centrifuged at 8,000 rpm, and then the precipitates (cellulose, hemicellulose, lignin and resistant starch) are collected and sieved with a 100 mesh sieve to obtain water insoluble fiber (8.5 kg in total).

The 2.7 kg of water soluble fiber and the 8.5 kg of water insoluble fiber are added to the 64.2 kg of sweet potato clear juice obtained in the second juicing process to obtain 75.4 kg of sweet potato clear juice containing dietary fiber, the sodium ions in the sweet potato clear juice containing dietary fiber are removed with a cation exchange resin, the pH is adjusted to 4 with a citric acid, and then a clear, concentrated sweet potato juice with high dietary fiber is obtained after blending, homogenization, degassing, high-temperature instantaneous sterilization (120° C., holds for 15 s), cooling, and filling.

Juice yield: (75.4−1)/(100−50)=149%.

It can be seen that the hydrolyzed skin dregs obtained in the first juicing process is added before squeezing to prevent the sweet potato paste from overflowing during the squeezing process, so that the pulp in the juice is reduced, and the juice yield is improved.

Example 3

55 kg of raw material sweet potatoes are mechanically peeled to obtain 50 kg of peeled sweet potatoes and 5 kg of sweet potato skin, 50 kg of water and 0.075 kg of Vc are added to the peeled sweet potatoes, and then the peeled sweet potatoes are crushed and heated to 95° C., and gelatinized after holding for 0.5 hour, so as to obtain 100 kg of a sweet potato paste.

5 kg of hydrolyzed skin dregs from other production processes are added to the sweet potato paste. The resulting mixture is squeezed to yield 50 kg of skin dregs and 50 kg of a squeezed clear juice.

15 kg of the skin dregs are taken for enzymolysis treatment, and the rest 35 kg of skin dregs are used for extracting dietary fiber.

Following the enzymolysis treatment conditions of Example 1, the 15 kg of skin dregs is hydrolyzed to obtain 9 kg of hydrolyzed skin dregs and 6 kg of squeezed sweet potato juice, and the 6 kg of squeezed sweet potato juice and 50 kg of the squeezed clear juice are combined to obtain 56 kg of squeezed clear juice.

Rough filtering and enzymolysis (The 0.04 kg of saccharifying enzyme, 0.04 kg of pectinase and 0.02 kg of protease are added, and the enzymolysis is carried out for 4 hours at the temperature of 40° C.) are performed to the 56 kg of squeezed clear juice in sequence, and then 55.7 kg of sweet potato clear juice is obtained after filtering.

At the same time, the 5 kg of sweet potato skin and the 35 kg of skin dregs used for extracting dietary fiber are combined to obtain 40 kg of sweet potato residue, 160 kg of warm water with temperature of 50° C. is added to the sweet potato residue, the ultrasonic extraction is carried out in an ultrasonic extractor, the ultrasonic power is 1,200 W, the temperature is 40° C., and the time is 40 min.

600 kg of warm water with temperature of 50° C. is added after the completion of ultrasonic extraction, the pH is adjusted to 2 with a citric acid aqueous solution with mass percentage concentration of 10%, and the hydrolyzed sweet potato residue liquid is obtained after hydrolysis for 80 min at the temperature of 60° C.

The shearing emulsification is performed to the hydrolyzed sweet potato residue liquid for 40 min through a high-shear mixing emulsification machine, so as to obtain the sheared and emulsified sweet potato residue liquid, and the fiber length in the sheared and emulsified sweet potato residue liquid is 0.3-4 microns.

80 kg of absolute ethyl alcohol is added to the sheared and emulsified sweet potato residue liquid, the alcohol precipitation is carried out for 40 min to obtain supernatant and precipitate, wherein the supernatant is heated to obtain recycled ethanol and residual liquid, and the precipitate is sieved with a 100 mesh sieve to obtain pectin, glucan and other water soluble fibers (2.4 kg in total); the recycled ethanol is further treated to obtain absolute ethyl alcohol, and the absolute ethyl alcohol can be repeatedly used.

The residual liquid adopts food grade sodium bicarbonate, the pH is adjusted to 10, the alkaline hydrolysis is carried out for 60 min at normal temperature to obtain an alkaline hydrolysis liquid, the alkaline hydrolysis liquid is centrifuged at 8,000 rpm, and then the precipitates (cellulose, hemicellulose, lignin and resistant starch) are collected and sieved with a 100 mesh sieve to obtain water insoluble fiber (8.6 kg in total).

The 2.4 kg of water soluble fiber and the 8.6 kg of water insoluble fiber are added to the 55.7 kg of sweet potato clear juice to obtain 75.4 kg of sweet potato clear juice containing dietary fiber, the sodium ions in the sweet potato clear juice containing dietary fiber are removed with a cation exchange resin, the pH is adjusted to 4 with a citric acid, and then a clear, concentrated sweet potato juice with high dietary fiber is obtained after blending, homogenization, degassing, high-temperature instantaneous sterilization (120° C., holds for 15 s), cooling, and filling.

Juice yield: (66.7−1.5)/(100−50)=130%.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing clear, concentrated sweet potato juice, the method comprising:
   a) cleaning, peeling, crushing, and gelatinizing a raw material of sweet potatoes to yield a sweet potato paste, and squeezing the sweet potato paste to obtain a first dreg and a first juice;
   b) performing enzymolysis to part of the first dreg, and adding the part of the first dreg after enzymolysis to the sweet potato paste for squeezing;
   c) performing enzymolysis to the first juice, and filtering to obtain a second juice;
   d) combining the rest of the first dreg and sweet potato skins generated during the peeling process to obtain a sweet potato residue;
   e) extracting dietary fiber from the sweet potato residue; and
   f) adding the dietary fiber to the second juice and post-treating the second juice to obtain a clear, concentrated sweet potato juice;
   wherein extracting the dietary fiber from the sweet potato residue in e) comprises:
      1) adding water to the sweet potato residue, performing ultrasonic extraction in an ultrasonic extractor, and obtaining a first mixture after the ultrasonic extraction;
      2) adding water to the first mixture, adjusting a pH value of the first mixture to between 1.5 and 2 by adding a citric acid aqueous solution, and performing hydrolysis for between 80 and 150 min at a temperature of between 30 and 80° C. to obtain a second mixture;
      3) performing shearing emulsification in a high-shear mixing emulsification machine to the second mixture for between 30 and 60 min and obtaining a third mixture, a length of fibers in the third mixture being between 0.1 and 6 microns;
      4) adding absolute ethyl alcohol to the third mixture for precipitation for between 30 and 60 min and obtaining a supernatant and a precipitate, heating the supernatant to obtain ethyl alcohol for recycling and a residual liquid; and
      5) sieving the precipitate obtained in 4) using a 80-100 mesh sieve to obtain a first dietary fiber; adding sodium bicarbonate to the residual liquid obtained in 4), adjusting a pH value to between 10 and 12, performing alkaline hydrolysis for between 60 and 90 min to obtain an alkaline hydrolysis liquid, centrifuging the alkaline hydrolysis liquid, collecting precipitates and sieving with a 80-100 mesh sieve to obtain a second dietary fiber.

2. The method of claim 1, wherein in b), 15-30% of the total weight of the first dreg is subject to enzymolysis treatment.

3. The method of claim 2, wherein:
water and an amylase are added to the part of the first dreg for enzymolysis treatment in b);
the part of the first dreg after enzymolysis is squeezed to obtain a second dreg and a squeezed sweet potato juice in b); and
the squeezed sweet potato juice is combined with the first juice for enzymolysis and filtering in c).

4. The method of claim 3, wherein the method further comprises adding the second dreg to the sweet potato paste for squeezing in b), and a weight ratio of the second dreg to the sweet potato paste is 5-10:100.

5. The method of claim 4, wherein in b), the amylase is present in an amount of 0.1-0.3% by weight of the part of the first dreg, and the enzymolysis treatment is conducted at a temperature of 85-95° C. for 1-2 hours.

6. The method of claim 1, wherein in step (1), the ultrasonic extraction is performed at a temperature of 30-60° C. for 30-40 min; a temperature of the water is 45-60° C., and a weight of the water is 3-5 times that of the sweet potato residue.

7. The method of claim 6, wherein in step (2), a temperature of the water is 45-60° C., a weight of the water is 10-20 times that of the sweet potato residue, and in step (4), a weight of the absolute ethyl alcohol is 8-13% of that of the third mixture.

8. The method of claim 1, wherein in c):
saccharifying enzyme, pectinase, and protease are added to the first juice for enzymolysis;
an enzymolysis period is 3-4 hours; and
a weight ratio of the first juice to the sum of weight of the saccharifying enzyme, pectinase, and protease is 1:0.001-0.002.

9. The method of claim 1, wherein during the post-treatment of the second juice in f), a cation exchange resin is utilized for removing sodium ions contained in the second juice, and then the clear, concentrated sweet potato juice is obtained after acidity adjustment, blending, homogenization, degassing, sterilization, and cooling.

10. The method of claim 1, wherein in 5), the first dietary fiber comprises pectin and glucan.

11. The method of claim 1, wherein in 5), the second dietary fiber comprises cellulose, hemicellulose, lignin, and resistant starch.

\* \* \* \* \*